United States Patent [19]
Ikeda et al.

[11] Patent Number: 5,271,473
[45] Date of Patent: Dec. 21, 1993

[54] FRONT BODY STRUCTURE FOR AUTOMOTIVE VEHICLE

[75] Inventors: Yoshinori Ikeda; Susumu Makimoto; Tadayuki Shigeoka; Makoto Tokuda, all of Hiroshima, Japan

[73] Assignee: Mazda Motor Corporation, Hiroshima, Japan

[21] Appl. No.: 990,890

[22] Filed: Dec. 17, 1992

[30] Foreign Application Priority Data

Dec. 18, 1991 [JP] Japan .................. 3-335064

[51] Int. Cl.⁵ .............................. B60K 11/04
[52] U.S. Cl. ...................... 180/68.4; 296/194
[58] Field of Search ................ 180/68.4, 68.6; 296/194, 203; 165/41, 67, 68, 149

[56] References Cited

U.S. PATENT DOCUMENTS

| | | | |
|---|---|---|---|
| 4,141,426 | 2/1979 | Hamada et al. | 180/68.4 |
| 4,542,934 | 9/1985 | Komatsu et al. | 296/194 |
| 4,597,603 | 7/1986 | Trabert | 296/194 |
| 4,940,281 | 7/1990 | Komatsu | 296/194 |
| 4,979,584 | 12/1990 | Charles | 180/68.4 X |
| 5,106,148 | 4/1992 | Ikeda et al. | 296/194 |
| 5,123,695 | 6/1992 | Kanemitsu et al. | 180/68.4 X |

FOREIGN PATENT DOCUMENTS

| | | | |
|---|---|---|---|
| 0178266 | 4/1986 | European Pat. Off. | 180/68.4 |
| 3-13282 | 2/1991 | Japan . | |

*Primary Examiner*—Brian Johnson
*Attorney, Agent, or Firm*—Keck, Mahin & Cate

[57] ABSTRACT

A front body structure forms an engine compartment in front of which a flat heat exchanger, provided with a pair of cooling fan units projecting lengthwise and rearward therefrom and transversely arranged with a space therebetween, is positioned. The front body structure includes a front body frame structure, defining opposite side walls of the engine compartment, and a front end frame structure, defining a front end wall of the engine compartment, which includes an upper front cross member extending transversely between the side walls so as to form an upper front end of the engine compartment. Stay members extend downward from the upper front cross member and are arranged so that a space between adjacent stay members is formed for receiving a cooling fan unit. A lower front cross member, extending transversely of the car body between the opposite side walls, forms a lower front end of the engine compartment.

9 Claims, 2 Drawing Sheets

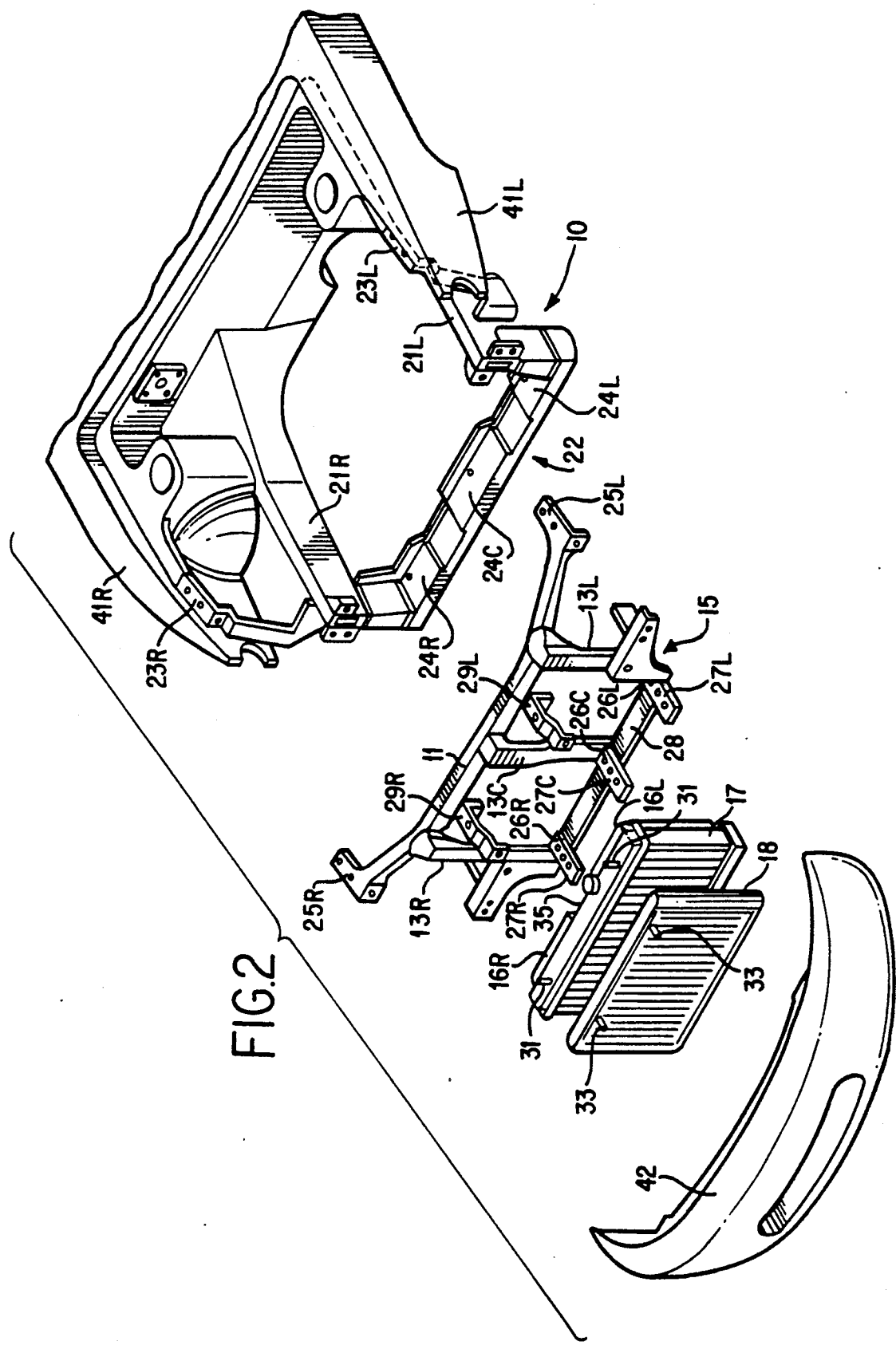

FRONT BODY STRUCTURE FOR AUTOMOTIVE VEHICLE

BACKGROUND OF THE INVENTION

1. Field of the Invention

This invention pertains to part of the body structure of a car and, more particularly, to the front body structure of a car body which is fitted with a modulated front end structure for holding a heat exchanger, such as a radiator.

2. Description of Related Art

In front engine cars, it is typical to install a heat exchanger, such as a radiator, in the engine compartment forming part of a front body portion of the car body along with an engine. Ordinarily, the radiator is positioned at the front of the engine compartment and is supported by a pair of, i.e., right and left, upper shroud members and a front cross member, both forming a part of the engine compartment. The right and left upper shroud members are secured to front ends of a pair of, i.e., right and left, front side members, each forming a part of the engine compartment, respectively. The front cross member extends between the right and left front side members and is secured to their front ends.

When a radiator is supported by such upper shroud members and a front cross member, a pair of electric cooling fans is positioned behind the radiator as a cooling means in order to cool engine coolant with high heat exchanging efficiency. Either of the cooling fans is or both of the cooling fans are activated in accordance with engine operation conditions. Further, in front engine cars, a condenser of an air conditioning system is generally positioned at the front of the engine compartment. Such a condenser is supported by upper shroud members and a front cross member as well as the radiator.

On the other hand, there is a tendency when designing cars, in particular passenger cars, to lower their front body portions in order to reduce air resistance during traveling and reduce the lengths of their front body portions in order to offer improved operability. However, if an engine compartment is formed in such a low height, short length front body portion, and if a heat exchanging means, such as a radiator, is provided at the front of the front body portion, upper shroud members and a front cross member must support the heat exchanging means from the back. Such a front body portion structure unavoidably positions the upper shroud members higher than and in front of the heat exchanging means. It is difficult to sufficiently lower and reduce the length of such a front body portion.

SUMMARY OF THE INVENTION

It is an object of the present invention to provide a front body structure for a car body which has a height which is lowered and a length which is shortened sufficiently even if it supports a heat exchanging means from its back.

The foregoing object of the present invention is achieved by providing a front body structure for a car body which forms an engine compartment in which an engine is installed and in front of which a generally rectangular box-shaped flat heat exchanger, such as a radiator, is positioned. The heat exchanger is provided with a pair of cooling fan units projecting lengthwise and rearward therefrom. The cooling fan units are transversely arranged with a space therebetween. The front body structure of the invention includes a front body frame structure for defining opposite side walls of the engine compartment, a lower front cross member extending transversely relative to the car body between the opposite side walls so as to form a lower front end of the engine compartment, and a front end frame structure for defining a front end wall of the engine compartment. The front end frame structure includes an upper front cross member, extending transversely between the opposite side walls so as to form an upper front end of the engine compartment, and a plurality of stay members extending vertically between the upper and front cross members and arranged at transverse separations so as to form a space between stay members. The radiator is positioned in front of and supported by the front end frame structure with the cooling fan units projecting rearward through the spaces, respectively.

According to the front body structure of the present invention, upper and lower front ends of the engine compartment are formed by the upper front cross member of the front end frame structure and the lower front cross member of the front body frame structure, respectively. These frame structures are rigidly secured together, and the upper front cross member is positioned behind a radiator supported by the front end frame structure. Stay members extend vertically and connect the upper and lower front cross members. Spaces are formed between adjacent stay members so that each cooling fan unit of a pair of cooling fan units of the heat exchanging means is allowed to project rearward through the space. Accordingly, the heat exchanging means can be placed close to the upper front cross member.

BRIEF DESCRIPTION OF THE DRAWINGS

The above and other objects and features of the present invention will clearly be understood from the following description of a preferred embodiment when considered in conjunction with the accompanying drawings, in which:

FIG. 2 is an exploded, perspective view of the front body portion shown in FIG. 1.

DETAILED DESCRIPTION OF THE INVENTION

Figure 1:
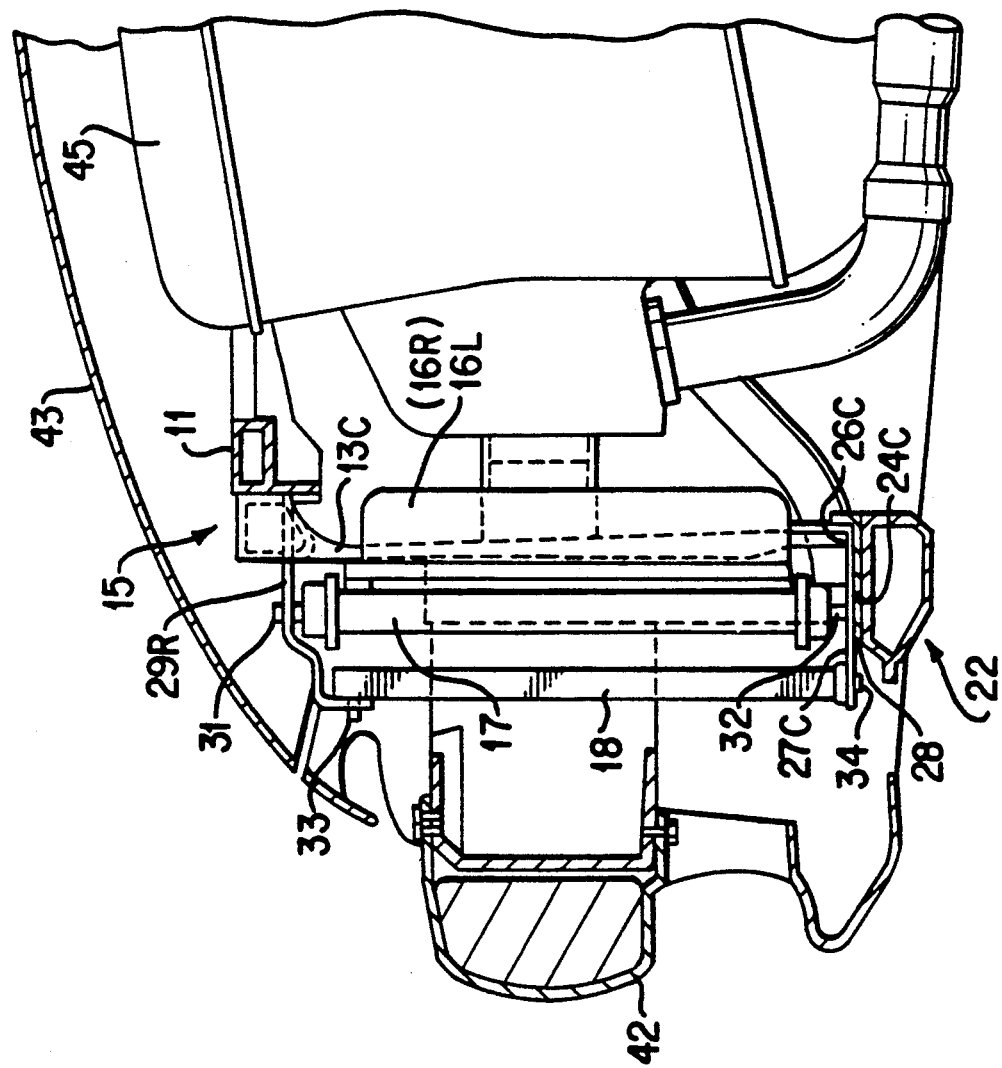
FIG. 1 is a cross-sectional view of a front body portion of a car body in accordance with a preferred embodiment of the present invention.

Because the general construction of an engine compartment of the present invention including, for instance, front side frame rails, a dash panel, etc., is well known to those skilled in the art, the present description will be directed to only those elements forming part of, or cooperating with, a front body structure in accordance with the present invention. It is to be understood that elements not specifically shown or described may take various forms well known to those skilled in the automobile art.

FIGS. 1 and 2 show, in detail, the front body portion of the invention. The front body portion includes a front body frame structure 10, forming a part of the car body, and a modulated front end frame structure 15. The front end frame structure 15 is assembled to the front body frame structure 10 to form an engine compartment in the front body portion. A condenser 18, for use with a generally rectangular box-shaped thin or flat air conditioner, and a thin, flat radiator 17 are attached to the front end frame structure 15 in that order from the front of the vehicle. A pair of, or right and left, modulated cooling fans 16R and 16L are provided behind the radiator 17 and project rearward therefrom. These modulated cooling fans are arranged so that a separation or space 35, transverse relative to the front body, is provided. A direction transverse relative to the front body is hereafter referred to as a "transverse direction" for simplicity.

The front body frame structure 10 includes a pair of, left and right, side frame rails 21L and 21R. Each of the side frame rails extends lengthwise, from front to back, relative to the car body. A direction which is oriented lengthwise relative to the car body is hereafter referred to as a "lengthwise direction" for simplicity. The front body frame structure 10 further includes a front cross member 22 extending in the transverse direction. The front cross member 22 is secured to both front ends of the left and right side frame rails 21R and 21L from below so as to connect the left and right side frames 21R and 21L. Each side frame 21R or 21L is provided with a mounting member 23R or 23L secured sideways thereto and extending upward therefrom. The front cross member 22 is provided with a plurality of mounting members 24C, 24R and 24L secured thereto at the center and at the right and left ends.

The front end frame structure 15 includes a transversely extending upper cross member 11. The upper cross member 11 is provided with a plurality of stay members, such as a center stay 13C and right and left side stays 13R and 13L. Each of the stays is welded or otherwise secured to the upper cross member 11. The upper cross member 11 is integrally formed at its opposite ends with mounting arms 25R and 25L. Each of the mounting arms extends laterally outward and bends rearward. The stays 13C, 13L and 13R are integrally formed at their lower ends with bracket arms 26C, 26L and 26R extending forward so as to form lower mounting members 27C, 27L and 27R, respectively, for mounting thereon the radiator 17. All of the bracket arms 26C, 26L and 26R are interconnected by means of a connecting member 28 extending parallel to the upper cross member 11. The front end frame structure 15 further includes a pair of, i.e., left and right, upper mounting members 29L and 29R, each secured to and extending forward from the upper cross member 11.

The modulated front end frame structure 15 of the front body frame structure 10 is assembled by bolting or otherwise securing the upper cross member 11 to the mounting member 23R and 23L extending from the front side frames 21L and 21R, respectively, through the mounting arms 25R and 25L. Thereafter, the center and side stays 13C, 13L and 13R are secured to the front cross member 22 by means of bolting or otherwise securing the connecting member 28 to the mounting members 24C, 24R and 24L.

The radiator 17 is provided with upper mounting pins 31, extending upward, and lower mounting pins 32, extending downward. The condenser 18 is provided with upper mounting pins 33, extending forward, and lower mounting pins 34, extending downward. The radiator 17 is placed on the lower mounting members 27C, 27L and 27R so as to lean against the center and side stays 13C, 13R and 13L and so as to fit the lower mounting pins 31 in mounting holes formed in the mounting members 27C, 27L and 27R. Similarly, the condenser 18 is placed on the lower mounting members 27C, 27L and 27R so as to maintain a proper distance from the radiator 17 and so as to fit the lower mounting pins 32 in mounting holes formed in the mounting members 27C, 27L and 27R. After attaching the upper is mounting members 29L and 29R to the condenser 18 and the radiator 17 so as to fit the upper mounting pins 33 of the condenser 18 and the upper pins 31 of the radiator 17 in holes of the mounting members 29L and 29R, they are secured to the upper cross member 11 to complete the assembly of the radiator 17 and the condenser 18 and their attachment to the front end frame structure 15. The cooling fans 16L and 16R, projecting rearward from the radiator 17, are positioned in spaces defined on opposite sides of the center stay 13C by the center and side stays 13C, 13L and 13R and the upper cross member 11. In other words, the center stay 13C is placed within the space 35 formed between the cooling fans 16L and 16R. Accordingly, the radiator 17 is allowed to be assembled and attached to the front end frame structure so as to lean against, or be placed close to, the upper cross member 11.

Assembling the front end frame structure 15 to the front body frame structure 10 completes the overall structure of the engine compartment 2. Then, left and right front fender panels 41L and 41R are secured to the left and right side frame rails 21L and 21R, respectively. Thereafter, a front bumper unit 42 is secured to the front body so as to conceal or cover the radiator 17 and the condenser 18 from the front. As seen in FIG. 1, a hood 43 is hinged to the front body 1 so as to open and close the engine compartment 2. An engine 45 is mounted behind the radiator 17 with the cooling fans 16L and 16R in the engine compartment 2.

According to the front body structure described above, because the radiator 17 is assembled and attached to the front end frame structure 15 so as to lean against, or be placed lengthwise in close proximity with, the upper cross member 11, the overall height of the front end frame structure of the engine compartment 2 is lowered. Furthermore, because the center stay 13C is placed within the space 35 between the cooling fans 16L and 16R, the thickness of the front end frame structure of the engine compartment 2 is decreased. In other words, the engine compartment 2 is formed so as to be geometrically short in length. In addition, because the center stay 13C does not obstruct the flow of cooled air from the radiator 17 from blowing on the engine 45, the engine 45 is cooled efficiently.

It is to be understood that although the present invention has been described in detail with respect to a preferred embodiment thereof, various other embodiments and variants may occur to those skilled in the art by following the teachings provided herein. Such other embodiments and variants falling within the scope and spirit of the invention are intended to be covered by the following claims.

What is claimed is:

1. A front body structure of a car body for forming an engine compartment in which an engine is installed and in front of which a generally rectangular, box-shaped, flat heat exchanger, provided with a pair of cooling fan units, projecting lengthwise rearward therefrom and transversely arranged with a space therebetween, is positioned, said front body structure comprising:

a front body frame structure defining opposite side walls of said engine compartment;

a lower front cross member extending transversely of said car body between said opposite side walls so as to form a lower front end of said engine compartment; and a front end frame structure defining a front end wall of said engine compartment, said front end frame structure comprising:

an upper front cross member extending transversely between said opposite side walls so as to form an upper front end of said engine compartment; and a plurality of stay members extending vertically from said upper front cross member and arranged so as to form spaces thereamong for receiving therein said cooling fan units.

2. A front body structure as defined in claim 1, wherein at least one of said stay members is positioned between said cooling fan units.

3. A front body structure as defined in claim 1, wherein said front end frame structure further comprises a lower mounting member extending lengthwise and forward from a lower end of each stay member for mounting said generally rectangular, box-shaped, flat heat exchanger thereon so as to assemble said heat exchanger to said front end frame structure.

4. A front body structure as defined in claim 3, wherein said lower mounting member is formed with a hole into which a vertical mounting pin extending from a bottom wall of said generally rectangular box-shaped flat heat exchanger, is fitted.

5. A front body structure as defined in claim 4, wherein said front end frame structure further comprises an upper mounting member extending lengthwise and forward from said upper front cross member for holding said generally rectangular box-shaped flat heat exchanger so as to assemble said heat exchanger to said front end frame structure.

6. A front body structure as defined in claim 5, wherein said upper mounting member has a front bent portion extending downward and formed with a hole into which a horizontal mounting pin extending forward from a front wall of said generally rectangular box-shaped flat heat exchanger is fitted.

7. A front body structure as defined in claim 6, wherein said upper mounting member is further formed with a hole into which a vertical mounting pin extending from a top wall of said generally rectangular box-shaped flat heat exchanger is fitted.

8. A front body structure as defined in claim 6, wherein said generally rectangular box-shaped flat heat exchanger comprises a radiator and a condenser placed in order from said front end frame structure, said radiator being provided with said vertical mounting pin and said condenser being provided with said horizontal mounting pin.

9. A front body structure as defined in claim 1, wherein said front end frame structure is placed on and secured to said front body frame structure as one unit.

* * * * *